United States Patent [19]

Pollock

[11] 4,317,539
[45] Mar. 2, 1982

[54] TRICKLE IRRIGATION

[76] Inventor: Keith B. Pollock, 225 Enfield Dr., Edinburg, Tex. 78539

[21] Appl. No.: 98,932

[22] Filed: Nov. 30, 1979

[51] Int. Cl.³ .................... A01G 25/02; B01D 29/10
[52] U.S. Cl. .................................. 239/1; 137/236 R; 137/593; 210/170; 239/76; 239/110; 239/112; 239/193; 239/200; 239/542; 239/562; 405/41
[58] Field of Search ............... 210/170, 453, 454, 499; 405/36, 39–44, 48, 51; 137/236, 544, 577, 593; 239/1, 11, 67, 76, 110, 112, 119, 124, 200, 201, 207, 266, 193, 536, 542, 556, 557, 560, 562, 565, DIG. 17, DIG. 15, DIG. 23

[56] References Cited

U.S. PATENT DOCUMENTS

| | | | |
|---|---|---|---|
| 2,017,277 | 10/1935 | Gatewood | 210/454 |
| 2,524,313 | 10/1950 | Gerling | 210/453 |
| 2,633,990 | 4/1953 | Simpson et al. | 210/453 X |
| 2,862,764 | 12/1958 | Frese, Jr. | |
| 3,159,172 | 12/1964 | Baxter | |
| 3,410,094 | 11/1968 | Shelley | |
| 3,518,831 | 7/1970 | Tibbals, Jr. et al. | |
| 3,572,630 | 3/1971 | Mendenhall | |
| 3,753,527 | 8/1973 | Galbraith et al. | |
| 3,797,741 | 3/1974 | Spencer | |
| 3,806,031 | 4/1974 | Olson | |
| 3,814,261 | 6/1974 | Morgan, Jr. | 210/453 |
| 3,819,118 | 6/1974 | Brock et al. | |
| 3,874,596 | 4/1975 | Baxter | |
| 3,920,037 | 11/1975 | Hoff et al. | |
| 3,954,223 | 5/1976 | Wichman et al. | |
| 4,059,228 | 11/1977 | Werner | |
| 4,156,504 | 5/1979 | Hegemann | 239/110 |

*Primary Examiner*—Andres Kashnikow
*Attorney, Agent, or Firm*—Cushman, Darby & Cushman

[57] ABSTRACT

A low pressure, trickle irrigation system and a method of irrigating utilizing the system are provided. The irrigation system includes a head control device for controlling the head of water providing pressure to the system with a water inlet to the head control device, and a pump operatively connected to the water inlet. A buried, generally horizontal main line is operatively connected to the bottom of the head control device, the main line of relatively thin-wall large diameter PVC pipe. A plurality of lateral lines are provided above the main line directly connected to the main line and also buried underground, and extending generally horizontally generally perpendicular to the main line and composed of PVC pipe having a diameter smaller than that of the main line. A plurality of open-top emitters are directly connected to each of the lateral lines and extend generally upwardly therefrom so that the open tops thereof are all above ground and at substantially the same height above sea level (taking into account head losses). A flush pipe is directly connected to each of the lateral lines, the flush pipe having a cap for releasably closing the open top thereof, and extending above the ground a distance smaller than the distance any emitter associated with the system extends above the ground.

27 Claims, 6 Drawing Figures

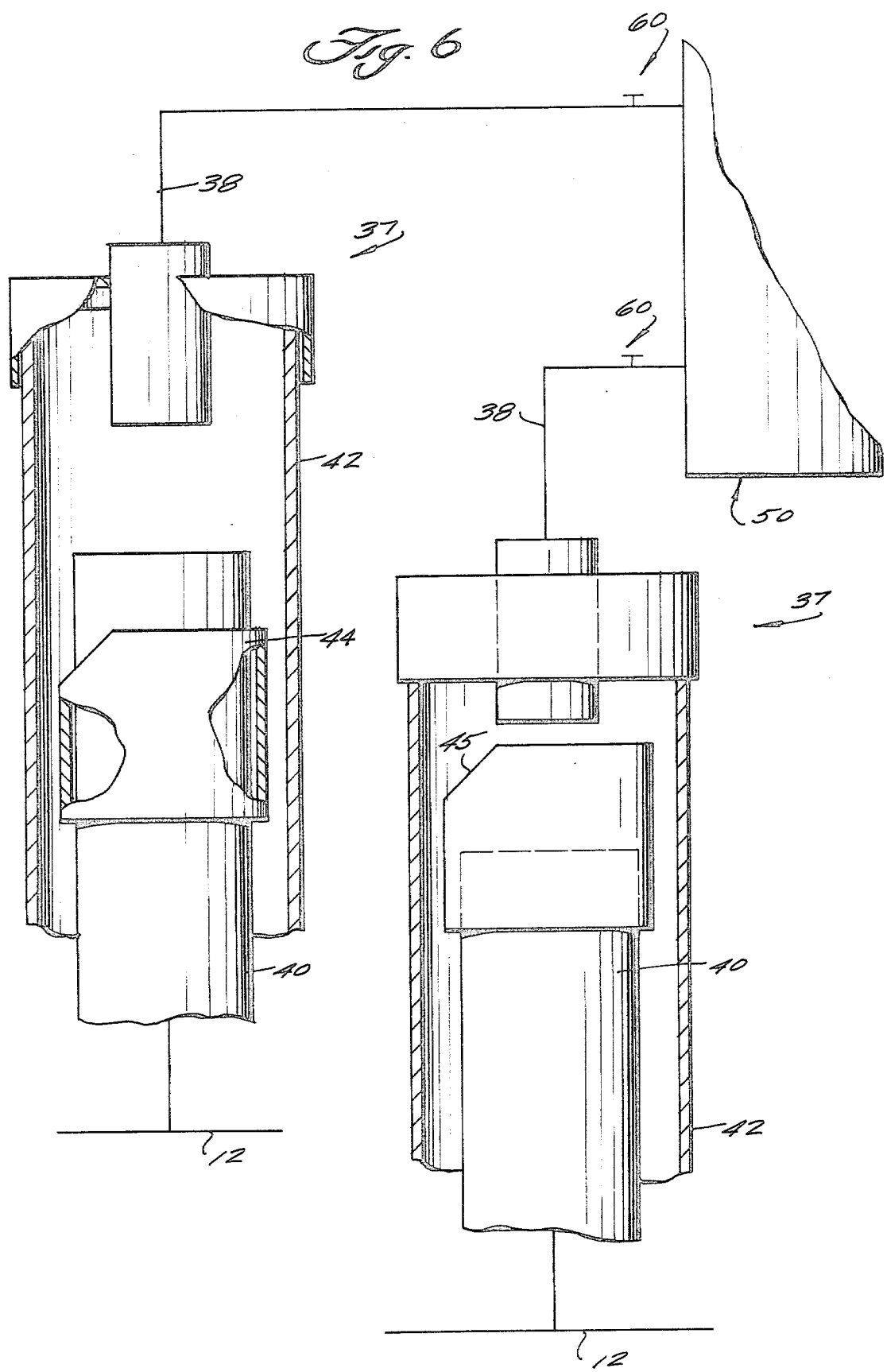

TRICKLE IRRIGATION

BACKGROUND AND SUMMARY OF THE INVENTION

It is highly desirable to provide alternatives to conventional sprinkler irrigation systems and the like since such systems tent to be very water and power intensive yet cannot achieve maximum plant growth rate. It is highly desirable to utilize trickle irrigation in place of conventional sprinkler systems and the like; in trickle irrigation water is applied on a slow steady basis to the plant's root zones to replace water which is lost by evaporation from the soil and transpiration by the plant. Trickle irrigation can result in a great reduction in the amount of water used, a reduction in weed growth since the water is applied proximate the root zone and not on a broad basis, can be used in a wide variety of terrains and soil types, and can spur more rapid growth and earlier production of young trees and plants.

While trickle irrigation systems are highly desirably, in the past there have been practical problems associated with conventional trickle irrigation systems. Even when used with clean source water, conventional trickle irrigation systems are relatively energy intensive and have a relatively short useful life. When used with very silty water, conventional trickle irrigation systems become clogged very quickly, require a great deal of labor for maintaining the system in operation, require sophisticated filtration systems that also consume energy in the cleaning thereof, and do not have the capability of delivering the predetermined amount of water to each discharge point with a reasonable, measured accuracy.

According to the present invention a trickle irrigation system, and method of utilization thereof, are provided that overcome most of the problems inherent in conventional trickle irrigation systems, while allowing all of the advantages associated with trickle irrigation to be achieved. The system according to the present invention operates at low pressure (10 psi maximum) using inexpensive rigid thin-walled pipe (e.g., PVC pipe) of relatively large diameter. The system is highly energy efficient, having a maximum power consumption of 0.05 hp/acre, and is capable of delivering a specified quantity of water to each discharge point with a deviation of only ±20%. The system is capable of handling even very silty, trashy, dirty water, no sophisticated filtration systems are provided, and the entire system may be periodically flushed with an absolute minimal amount of labor input. The system is durable, having a minimum life expectancy of 10 years, requires little labor for maintenance, and can be readily inspected by an operator on a motor vehicle and easily maintained in the field.

According to one aspect of the present invention, a low pressure, trickle irrigation system is provided comprising a buried, generally horizontal main line adapted to be connected to a source of water, and a plurality of open-top emitters in liquid communication with the main line. The emitters each extend generally vertically a predetermined distance E above the ground with the discharge points of all emitters having substantially the same height above sea level (taking into account head losses). An open-top flush pipe is in fluid communication with the emitters and extends generally vertically a predetermined distance L above the ground, the distance L being significantly less than the lowest distance E. Capping means are provided for removably capping the flush pipe so that no water may flow through the open top of the flush pipe when in place, and water may flow through the open top when not in place.

According to another aspect of the present invention a low pressure, trickle irrigation system is provided comprising a head control means for controlling the head of water providing pressure to the system; a water inlet to the head control means and pumping means operatively connected to the water inlet; and a buried, generally horizontal main line operatively connected to the bottom of the head control means, the main line of relatively thin-wall rigid large diameter pipe (e.g., PVC pipe). A plurality of lateral lines are provided above the main line, directly connected to the main line and buried underground and extending generally horizontally and generally perpendicular to the main line. The lateral lines also are of a thin walled rigid pipe (e.g., PVC pipe) with a diameter smaller than that of the main line. A plurality of open-top emitters are directly connected to each of the lateral lines and extend generally upwardly therefrom so that the discharge points thereof are all above ground and at substantially the same height above sea level. Preferably the open top of each emitter includes a V-shaped notch formed in the emitter pipe wall providing a water discharge point through which notch the water trickles, and a dust cover may be provided on top of each of the emitters. The system is very useful in irrigating a plurality of rows of trees. In that case, each lateral line extends parallel to the rows of trees intermediate two rows so that the emitters associated with each lateral line water two tree rows, each emitter disposed between trees; and each lateral line is spaced from adjacent other lateral lines a distance approximately equal to the width of two rows of trees.

According to another aspect of the present invention, a holding tank for a low pressure irrigation system is provided, the tank comprising tank walls, a removal lid, and a flexible mesh having peripheral portions thereof disposed between the removal lid and the tank walls and having a central portion of the mesh loosely hanging in the tank interior. The flexible mesh may be of any open weave non-biodegradable material such as a woven glass having a open weave of about 5 to 10 mesh/in. A liquid inlet extends into a top portion of the tank and discharges into the interior volume defined between the flexible mesh and tank lid, and an outlet from the tank is located on the opposite side of the flexible mesh from the tank inlet. Valve means are provided in the tank outlet for controlling the level of liquid in the tank so that it is above the central portion of the flexible mesh but below the peripheral portions thereof.

The invention also contemplates a method of irrigating a land area. The method includes the following steps: Disposing an irrigation system, including a head control device with an underground main line extending therefrom and emitters operatively connected to the main line and extending vertically to an open-top above ground level, in the land area. Sizing the pipes defining the irrigation system and controlling the head control device so that the maximum pressure in the system is about 10 psi, and so that the pressure is zero head plus the head necessary to supply water to the open tops of the emitters. And, supplying water from a source to the head control device so that the power consumption of the entire system is a maximum of about 0.05 hp/acre of land irrigated thereby. The irrigating water supply may be heavily silted with the only filtration provided being prior to discharge of the water into the head control device utilizing a filter having a maximum of 10 mesh/in. By removing caps from flush pipe associated with each group of emitters, flushing of the entire system is greater facilitated so that the method may be practiced indefinitely without clogging of the system and with a minimal of labor input.

It is the primary object of the present invention to provide a practical, effective, low energy consumption, low pressure, trickle irrigation system and irrigating method. This and other objects of the invention will become clear from an inspection of the detailed description of the invention, and from the appended claims.

BRIEF DESCRIPTION OF THE DRAWINGS

FIG. 6 is a schematic view of details of the head control devices of FIG. 5.

DETAILED DESCRIPTION OF THE DRAWINGS

Figure 1:
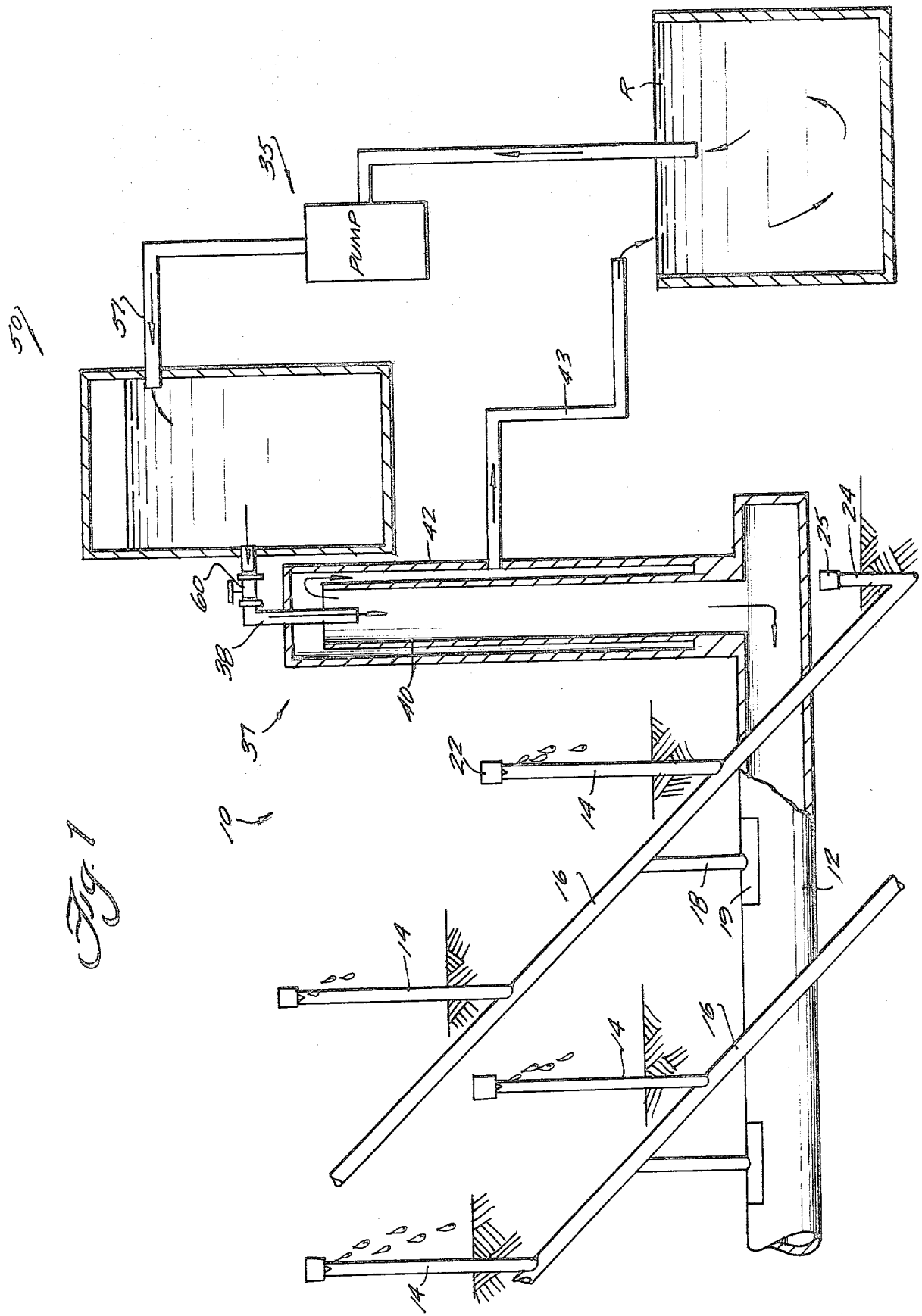
FIG. 1 is a schematic view, partly in elevational perspective and partly in cross-section, of an exemplary irrigation system according to the present invention.

The main component parts of the exemplary irrigation system 10 (see FIG. 1) according to the present invention include at least one main line 12 adapted to be connected to a source of water, such as a reservoir R, and a plurality of open-top emitters 14 in liquid communication with the main line 12 and extending generally vertically a predetermined distance E (see FIG. 3) above the ground, with the discharge points of all the emitters having substantially the same height above sea level (taking into account head losses). Preferably, the emitters 14 are operatively connected to the main line 12 by a plurality of lateral lines 16. Each lateral line 16 is buried underground (as is the main line 12) and extends generally horizontally, and generally perpendicularly (at least intersecting) to the main line 12. A plurality of emitters 14 are connected to each lateral line 16, with a vertically extending conduit 18 between each lateral line 16 and the main line 12, the conduit 18 being connected to a top portion of the horizontally extending main line 12 by a saddle T 19, which provides rigidity for the connection.

Preferably, all of the pipes associated with the irrigation system 10 according to the present invention are rigid thin-walled relatively large diameter pipes. Especially useful are PVC pipes. The main line 12 may have a diameter of about 6 to 15 inches, while the conduits 18 have a diameter of one and one-quarter inches, and the lateral lines 16 and emitters 14 have a diameter of about one inch.

In order to provide a controlled discharge point for each of the emitters 14, preferably a V-shaped notch 21 (see FIG. 3) is formed in the wall of the emitter pipe adjacent the open top thereof. A dust cover 22 may be provided for disposition over the open top of the emitter 14. The dust cover 22 does not pressurize the system, however, but merely prevents the fall of foreign material into the open top of the emitter 14 with which it is associated.

In dimensioning the emitters 14, it is desirable to make the tops of the emitters 14 high enough above the ground so that visual inspection of the emitters can be made from a moving vehicle (such as an all terrain vehicle) at speeds of two miles per hour or greater. However, the height of the tops of the emitters off of the ground should be low enough so that the tops may be closely inspected and serviced, if necessary, and so that when the material is made of PVC or the like, the wind cannot cause significant enough flexing thereof so that the emitter is actually turned into a pump, which would cause the emitter to deliver much more water than its predetermined desired rate. Preferably, the distance E is between 18 inches and 6 feet.

Figure 3:
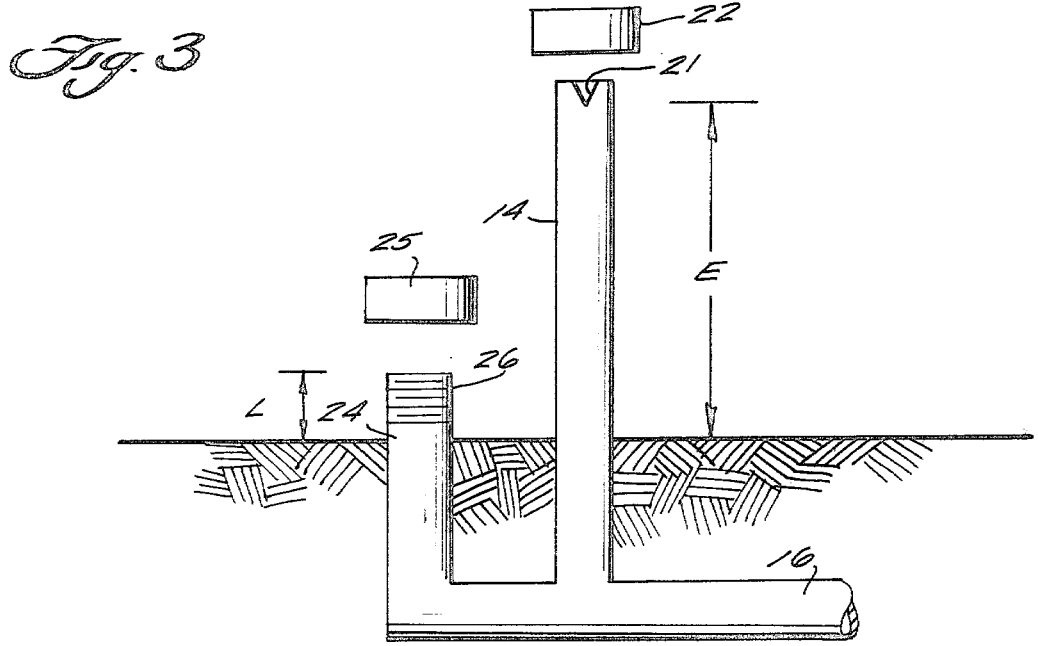
FIG. 3 is a side view of an exemplary emitter and flush pipe utilizable in the system according to the invention.

As also illustrated most clearly in FIGS. 1 and 3, an open-top flush pipe 24 is associated with each of the lateral lines 16, preferably providing an end-termination thereof. Each flush pipe 24 extends generally vertically a predetermined distance L (see FIG. 3) above the ground, the distance L being significantly less than the lowest distance E of any emitter 14 with which the main line 12 is associated. Capping means are provided for removably capping the flush pipe 24 so that no water may flow through the open top thereof when in place, and water may flow through the open top thereof when not in place. The capping means preferably comprises a cap 25 (see FIG. 3) having a screw threaded interior for cooperation with the exterior screw threads 26 provided on the flush pipe 24. When the cap 25 of a flush pipe 26 is removed, the water level in all of the emitters 14 connected to the lateral line 16 with which the uncapped flush pipe 24 is associated drops, and water is spewed out of the top of the flush pipe 24, and air that was previously trapped in the system has a tendency to spew out of each of the emitters 14 of that lateral line 16. It is noted that in order to prevent trapped air from adversely affecting water flow through the system, each of the conduits 18 extends upwardly from a top portion of the line 12 to a bottom portion of a lateral line 16.

Figure 4:
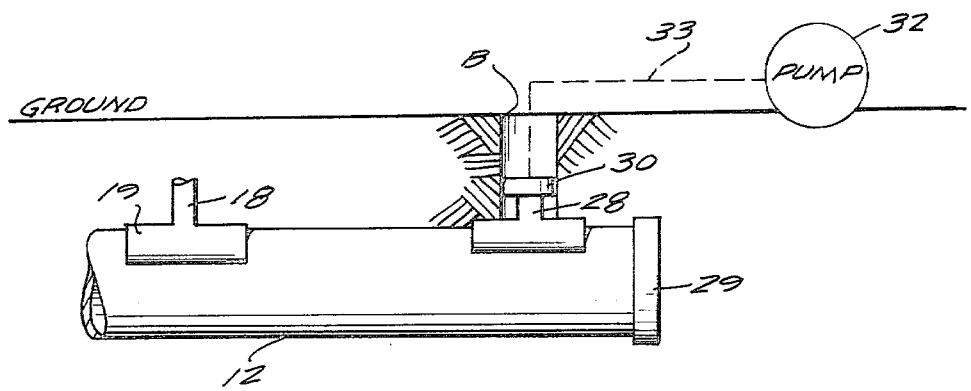
FIG. 4 is a side detailed view of an exemplary main line flushing apparatus utilizable with the system of FIG. 1.

In order to also effect flushing of the main line 12, according to the present invention an open-top branch line 28 (see FIG. 4) may be provided adjacent an end-termination 29 of the main line 12. A capping means, such as a cap 30, may be provided for removably capping the branch 28 so that with the capping means in place water cannot flow through the open top of the branch 28, but with the cap 30 removed it can. As illustrated in FIG. 4, the cap 30 may be located underground with access thereto provided by the bore B in the ground, or under some circumstances the branch 28 may be elongated with the cap 30 disposed above ground. In any case, it is desirable to provide some sort of means facilitating interconnection of a pump 32 to the branch line 28 when the cap 30 is removed. Such interconnection facilitating means may comprise exterior screw threads provided on the branch 28 for cooperation with interior screw threads on a conduit 33 leading to the pump 32, or any other like suitable device. The size of the pump 32 would be designed to be substantially the same size as a main pump associated with the irrigation system 10 (e.g., pumping means 35 illustrated in FIGS. 1 and 5).

The irrigation system according to the present invention also comprises a head control means, indicated generally at 37, for controlling the head of water providing pressure to the main line 12. Preferably a water inlet conduit 38 to the head control means 37 is operatively connected to a main pumping means 35 for the entire system, which in turn is operatively connected to a reservoir R. The main pumping means 35 preferably comprises a fixed displacement pump, although any other suitable type of pumping means may be utilized (and in the case where the reservoir R is located well above the entire irrigation system the reservoir R itself comprises the pumping means).

The head control means 37 comprises an interior open-top head pipe 40 (see FIGS. 1 and 6) with the main line 12 connected to the bottom of the main head pipe 40. An overflow conduit 42 is generally concentric with and surrounds the head pipe 40, with a discharge pipe 43 from the overflow conduit 41 back to the reservoir R. As illustrated, preferably a device is provided associated with the head pipe 40 for adjusting the head provided thereby. Such a device preferably takes the form of a sleeve 44 mounted for tight slidable movement over the exterior of the pipe 40 and adjustable to positions above (right hand head control devide 37 in FIG. 6) and below (left hand device 37 in FIG. 6) the open top of the head pipe 40. A notch 45 may be provided along one side of the sleeve 44 to direct the overflow of water into the overflow conduit 42. Preferably the sleeve 44 also is a section of PVC pipe, and the head pipe 40 and overflow conduit 42 also are PVC pipe.

A holding tank 50 is provided between the pumping means 35 and the head control device 37. The holding tank 50 allows for ready adjustment of the flow to the head control device 37, not being dependent upon variations in the pump 35 or the reservoir R, and also facilitates the introduction of herbicide, fertilizer, or the like into the irrigation system. The main component parts of the holding tank 50 include the outlet therefrom, which is one in the same with the inlet pipe 38 to the head control device 37, and an inlet pipe 51 thereto from the pumping means 35. The holding tank to is illustrated schematically in FIG. 1, and in more detail in FIG. 5.

Figure 5:
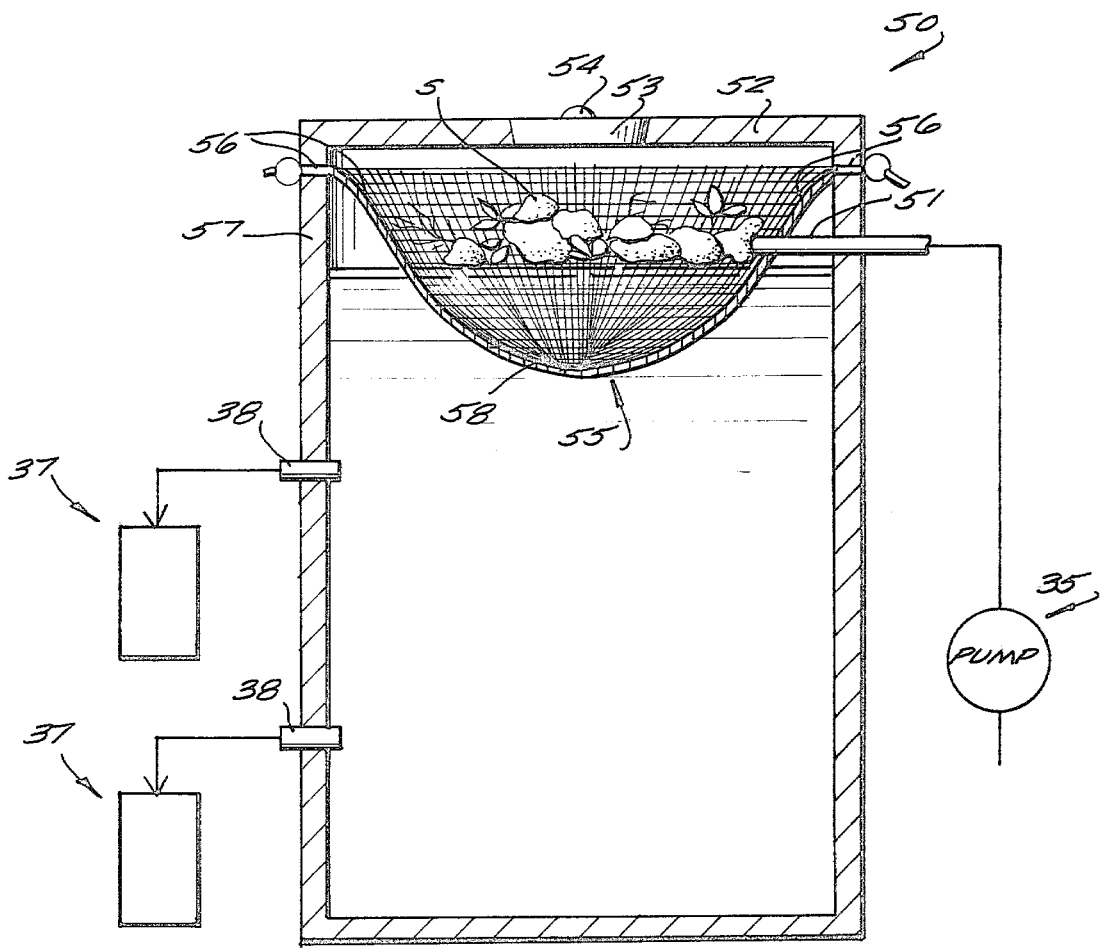
FIG. 5 is a cross-sectional view taken along a vertical plane of an exemplary holding tank for the irrigation system according to the present invention.

The holding tank 50, as seen in FIG. 5, preferably includes a removable main lid 52, which main lid 52 preferably includes an access lid 53 with a handle 54 centrally located therewithin. In order to provide a coarse filter for the water for the irrigation, a flexible mesh 55 is operatively mounted in the tank 50 between the inlet 51 and outlet 38. Preferably, the flexible mesh 55 includes peripheral portions 56 which are received between the lid 52 and the tops of the side walls 57 of the tank 50. Other accessory devices can also be utilized to hold the mesh 55 in place. The mesh 55 also includes a central portion 58 loosely hanging in the tank interior. The inlet 51 to the holding tank 50 is disposed in a top portion of the tank 50 on the opposite side of the mesh 55 from the outlet pipes 38, and preferably the inlet pipe 51 extends through a side wall 57 of the tank 50 just underneath the lid 52 to discharge water into the volume defined by the mesh 55 and the lid 52, an opening being provided in the mesh 55 for the pipe 51 to pass therethrough.

The flexible mesh 55 may be of any suitable non-biodegradable material having an open weave construction. One especially suitable material for the mesh is a woven glass having an open weave of about 5 to 10 mesh/in. The minimum desirable size of any type of filtering device associated with the irrigating system 10 is about 10 mesh/in.

For the flexible mesh 55 to be most effective, preferably controlling means are provided for controlling withdrawal of water from the holding tank 50 to one or more head control devices 37. Such controlling means control the withdrawal so that the level of water in the holding tank is above the central portion 58 of the flexible mesh 55 but below the peripheral portions 56 thereof, as illustrated at FIG. 5. In such a situation, trash, sticks, weeds, and the like are automatically moved under the influence of the force of the water discharging through the inlet pipe 51 into the tank 50 to peripheral portions of the meah 55 above the water level, while the mesh 55 below the water level (whether or not the central portion 58 floats or is heavier than water it is considered below the water level) remains clear allowing free water passage therethrough. By removing the access lid 53, an individual can reach into the holding tank 50 through the top thereof and periodically remove the refuse S (see FIG. 5) on the peripheral portions of the mesh 55 above the water level. The control means for controlling the level of the water preferably comprises a conventional infinitely adjustable flow control valve 60 operatively disposed in each of the pipes 38. The valves 60 preferably are manually actuated.

Where a common holding tank 50 and pumping means 35 are provided for supplying irrigation water to main lines 12 at greatly different levels, two or more head control devices 37 will be associated with the holding tank 50, as illustrated in FIGS. 5 and 6. The point at which the pipe 38 for each head control device 37 is located with respect to the bottom of the tank 50, in conjunction with the positioning of the head pipe 40 of the head control device 37, would determine the amount of head provided for the main line 12 with which the system was associated. For areas to be irrigated on vastly different levels, the distances between the pipes 38 associated with the head controls 37 therefor would also differ significantly.

Figure 2:
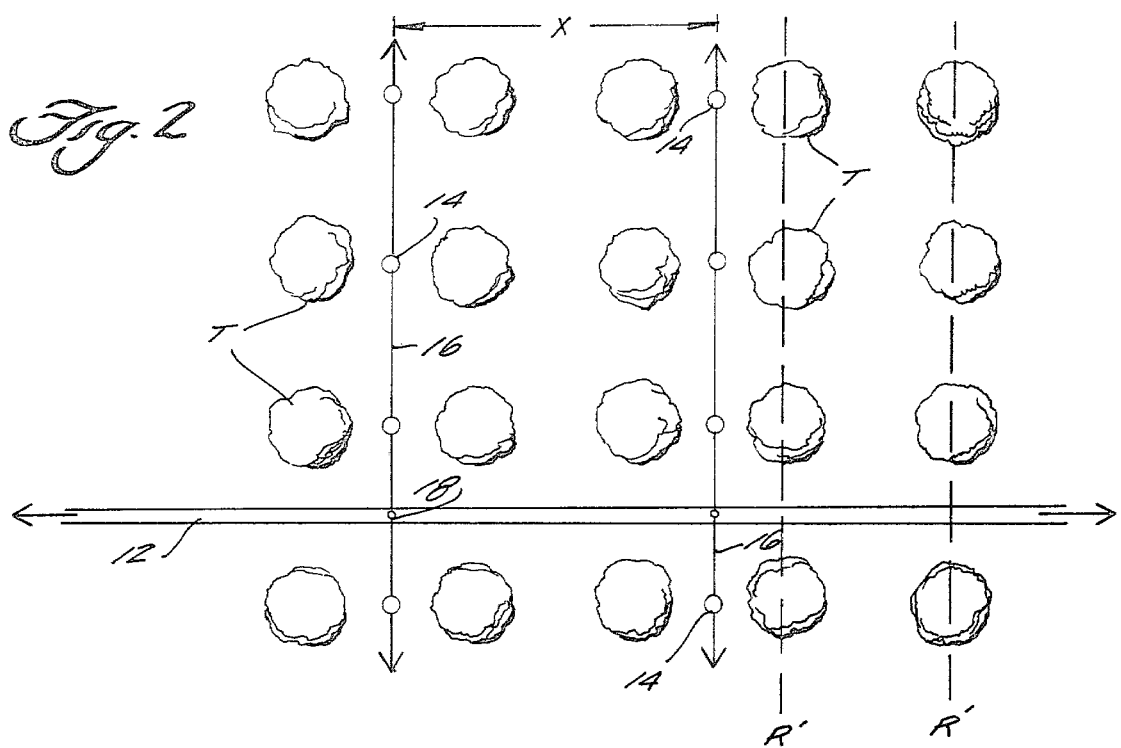
FIG. 2 is a top plan diagrammatic view illustrating important component parts of an irrigation system according to the present invention in use.

A typical installation of an irrigation system according to the present invention in an orchard is illustrated schematically in FIG. 2. The orchard contains a plurality of trees T disposed in rows R'. Each of the lateral lines 16 extends substantially parallel to the rows R', with the emitters 14 associated with each lateral line 16 positioned so that it waters two tree rows. Preferably each emitter 14 is disposed between two trees T in adjacent rows R' so that one emitter waters two trees. Each lateral line 16 is spaced from adjacent other lateral lines a distance X approximately equal to the width of two rows of trees (the width of two rows of trees T also being indicated by X in the FIG. 2).

In utilizing the system 10 according to the present invention, a method of irrigating land may be practiced which comprises the following steps: Disposing the irrigation system, including a head control device 37 with an underground main line 12 extending therefrom and emitters 14 operatively connected to the main line 12 and extending vertically to an open-top above ground level, in the land area to be irrigated. Sizing the pipes defining the irrigation system (e.g., 12, 14, 16, 18) and controlling the head control device 37 so that the maximum pressure in the system is about 10 psi (and preferably much less than that—e.g., 2 psi) and so that the pressure is zero head plus the head necessary to supply water to the open-tops of the emitters 14. And, supplying water from a source to the head control device so that the power consumption for the entire system is a maximum of about 0.05 hp/acre of land area irrigated. The disposing step preferably is accomplished by providing PVC thin-walled relatively large diameter pipes for essentially all the pipes in the irrigation system, and when the irrigating water supplied is heavily silted the supplying step is further accomplished by effecting filtration of the water before it is supplied to the head control device 37 with a filter (e.g., mesh 55) having a minimum size of 10 mesh/in. The disposing step is further accomplished by providing a plurality of buried generally horizontal lateral lines 16 associated with the main line 12 with a plurality of emitters 14 extending upwardly from each lateral line, and wherein an open-top flush pipe 24 is associated with each of the lateral lines 16 extending upwardly therefrom above ground a distance L less than the height E above the ground of any emitter 14 associated with the lateral line, and with each flush pipe having a cap 25 therefor. The method comprising the further step of occasionally flushing a plurality of lateral lines by removing the cap 25 from the flush pipes associated with those lateral lines whereby the method may be practiced indefinitely with clogging of the system.

One exemplary operative sequence of the system 10 according to the present invention will now be described:

The grades for a land area to be irrigated are determined, and the height of the discharge point (notch 21) of each emitter 14 in each specific portion of the land area to be irrigated is determined, taking into account projected head losses which may be readily calculated. In each area to be irrigated, the emitters 14 are sized so that each emitter 14 will extend above ground a minimum distance E of about 18 inches and a maximum distance of about 6 feet.

The main line 12 extending from a head control device 37 is buried underground with a plurality of lateral lines 16 attached thereto by conduits 18 and saddle Ts 19, the lateral lines 16 also being buried and extending substantially perpendicular (at least intersecting) the main line 12. The emitters 14 are disposed extending vertically upwardly from the lateral lines 16, with a flush pipe 24 associated with each lateral line 16.

Water is withdrawn from a reservoir R by the pump means 35, passed through inlet 51 to a holding tank 50, coarsely filtered by flexible mesh 55, and passed through pipe 38 to a head control device 37. The rate of flow is controlled by a flow control valve 60, with the overflow from the head control device 37 passing through conduit 43 back to the reservoir R. By sliding the sleeve 44 with respect to the head pipe 40, the exact level of the head provided by the head control device 37 may be adjusted. Water continuously flows through the main line 12, conduits 18, lateral lines 16, and emitters 14 to trickle down onto the ground surrounding the emitters 14 and water the trees T adjacent thereto.

When it is desired to flush out the system 10, a plurality of the caps 25 associated with flush pipes 24 of lateral lines 15 are removed, water spewing out of the pipes 24 and air spewing out of the emitters 14. Preferably 10 to 15 lateral lines 16 are flushed at the same time, then the flush pipes 24 associated with those lines are capped and another plurality of flush pipe caps are removed. When it is desired to flush the main line 12, the cap 30 is removed, the conduit 33 inserted into the branch 28, and the pump 32 operated to facilitate flushing of the line 12.

It will thus be seen that according to the present invention a low pressure, trickle irrigation system, and method of irrigation, have been provided that use an extremely small amount of power, are capable of operating over long periods of time even with very silty water, accurately deliver a specified amount of water to each discharge point with reasonable measured accuracy, require a minimum amount of labor input for maintenance, and may be easily visually inspected.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent systems and methods.

What is claimed is:

1. A low pressure, trickle irrigation system comprising:
a buried, generally horizontal main line adapted to be connected to a source of water;
a plurality of open-top emitters in communication with said main line and extending generally vertically a predetermined distance E above ground with the discharge points of all emitters having substantially the same height above sea level;
an open-top, closed bottom flush pipe in fluid communication with said emitters and extending generally vertically a predetermined distance L above ground, said distance L being significantly less than the lowest said distance E; and
capping means for removably capping said flush pipe open top so that no water may flow through the open top of said flush pipe when in place, and water may flow through the open top when not in place.

2. A system as recited in claim 1 further comprising a plurality of lateral lines directly connected to said main line, buried underground and extending generally horizontally generally perpendicular to said main line; and wherein a plurality of said emitters and a flush pipe is directly connected to each of said lateral lines, extending vertically upwardly therefrom.

3. A system as recited in claim 2 wherein each of said lateral lines is disposed vertically above said main line, and further comprising a vertically extending conduit connected between the top of said main line and the bottom of each of said lateral lines.

4. A system as recited in claim 3 wherein a saddle T connection is provided at each connection of said vertical conduit to said main line.

5. A system as recited in claims 1 or 2 wherein said distance E is between about 18 inches and about 6 feet above ground.

6. A system as recited in claims 1 or 2 further comprising an end termination of said main line; an upwardly extending open top branch line extending from a point adjacent said end termination; and capping means for removably capping said branch so that with said capping means in place water cannot flow through the open top of said branch, and with said capping means removed water from said main line can flow through said branch; and means for facilitating interconnection of a pump to said branch line with said capping means removed.

7. A system as recited in claim 2 wherein said system irrigates a plurality of rows of trees; and wherein each lateral line extends parallel to said rows of trees intermediate two rows so that said emitters associated with each lateral line water two tree rows; and wherein each lateral line is spaced from adjacent other lateral lines a distance approximately equal to the width of two rows of trees.

8. A system as recited in claim 2 further comprising a holding tank and a head control device, operatively connected to said main line, and pumping means for pumping water from a source to said holding tank and a conduit extending from said holding tank to said head control device, said main line being directly connected to the bottom of said head control device.

9. A system as recited in claim 8 wherein a line from said pumping means extends into a top portion of said holding tank, and further comprising a flexible mesh extending around substantially the entire internal periphery of said holding tank, below said line from pumping means.

10. A system as recited in claim 9 wherein said tank has a removable main lid, and wherein peripheral portions of said flexible mesh are held between said main lid and the tank's walls, with a central portion of the mesh loosely hanging in the tank interior.

11. A system as recited in claim 10 further comprising means for controlling withdrawal of water from said holding tank so that the level of water in said holding tank is above said central portion of said flexible mesh but below said peripheral portions thereof.

12. A system as recited in claim 10 wherein said tank main lid includes a removable access lid centrally located in the main lid.

13. A low pressure, trickle irrigation system comprising head control means for controlling the head of water providing pressure to said system; a water inlet to said head control means and pumping means operatively connected to said water inlet; a buried, generally horizontal main line operatively connected to the bottom of said head control means, said main line of relatively thin-walled rigid large diameter pipe; a plurality of lateral lines above said main line, directly connected to said main line, buried underground, and extending generally horizontally generally perpendicular to said main line and having a pipe diameter smaller than that of said main line; and a plurality of open-top emitters directly connected to each of said lateral lines and extending generally upwardly therefrom so that the discharge points thereof are all above ground and at substantially the same height above sea level.

14. A system as recited in claims 2 or 13 wherein said main line, lateral lines, and emitters are made of PVC pipe.

15. A system as recited in claims 1 or 13 wherein the open top of each of said emitters includes a V-shaped notch formed in the emitter pipe wall providing a water discharge point, through which notch the water trickles, and wherein a covering means is provided for each of said emitters.

16. A system as recited in claim 13 wherein said head control means comprising a vertically extending open-topped head pipe; an overflow conduit generally concentric with and surrounding said head pipe; a water inlet to said head pipe; and a sleeve mounted for movement along said head pipe to positions above or below said open top of said head pipe.

17. A system as recited in claim 13 further comprising a holding tank operatively connected between said head control means and said pumping means; a first outlet conduit extending from a first portion of said holding tank a predetermined level above the bottom thereof and providing an inlet to said head control means; and a flow control valve disposed in said outlet conduit for controlling the flow rate of water therethrough.

18. A system as recited in claim 17 wherein said head control means and main line comprises a first head control means and main line, respectively; and further comprising a second head control means and a second main line; a second outlet conduit extending from a second portion of said holding tank a predetermined level above the bottom thereof different than said first control means level and providing an inlet to said second head control means; and a flow control valve disposed in said second outlet conduit.

19. A system as recited in claim 17 wherein a line from said pumping means extends into a top portion of said holding tank; and further comprising a removable main lid for said tank; a flexible mesh having peripheral portions thereof held between said main lid and the tank walls with a central portion of the mesh loosely hanging in the tank interior; said line from said pumping means extending through a peripheral portion of said flexible mesh to discharge water into the volume defined thereby; and wherein said flow control valve comprises means for controlling withdrawal of water from said holding tank so that the level of water in said holding tank is above said central portion of said flexible mesh but below said peripheral portions thereof.

20. A system as recited in claim 13 wherein the maximum power input to said pumping means necessary to effect complete irrigation of a predetermined area in which said system is installed is 0.05 hp/acre.

21. A system as recited in claim 13 wherein said system irrigates a plurality of rows of trees; and wherein each lateral line extends parallel to said rows of trees intermediate two rows so that said emitter associated with each lateral line waters two tree rows; and wherein each lateral line is spaced from adjacent other lateral lines a distance approximately equal to the width of two rows of trees.

22. A system as recited in claim 14 wherein each of said emitters is disposed above the ground a height great enough to allow ready visual inspection thereof at speeds of 2 m.p.h. or greater from the seat of a moving vehicle, and small enough so that action of the wind on said emitter will not effect a pumping action at the emitter discharge.

23. A method of irrigating a land area comprising the steps of: (a) disposing an irrigation system, including a head control device with an underground main line extending therefrom and emitters operatively connected to the main line and extending vertically to an open-top above ground level, in said land area; (b) sizing the pipes defining the irrigation system and controlling the head control device so that the maximum pressure in the system is about 10 p.s.i., and so that the pressure is zero head plus the head necessary to supply water to the open-tops of the emitters; and (c) supplying water from a source to the head control device so that the power consumption for the entire system is a maximum of about 0.05 hp/acre of land area irrigated.

24. A method as recited in claim 23 wherein step (a) is accomplished by providing PVC thin-walled relatively large diameter pipes for esentially all pipes in the irrigation system.

25. A method as recited in claim 23 wherein the irrigating water supplied is heavily silted; and wherein step (c) is further accomplished by effecting filtration of the water before it is supplied to the head control device with a filter having a minimum size of 10 mesh/in.

26. A method as recited in claims 23 or 25 wherein step (a) is further accomplished by providing a plurality of buried generally horizontal lateral lines associated with the main line with a plurality of emitters extending upwardly from each lateral line, and wherein an open-top flush pipe is associated with each of the lateral lines, extending upwardly therefrom above ground a distance less than the height above ground of any emitter associated with the lateral line, each flush pipe having a cap therefor; and comprising the further step of occasionally flushing a plurality of lateral lines by removing the caps from the flush pipes associated with those lateral lines; whereby the method may be practiced indefinitely without clogging of the system.

27. A method as recited in claim 23 wherein step (a) is further accomplished by providing a plurality of buried generally horizontal lateral lines associated with the main line, with a plurality of emitters extending upwardly from each lateral line; and wherein the area to be irrigated is an orchard, having a plurality of rows of trees; and comprising the further step of disposing each lateral line so that it extends substantially parallel to said rows of trees intermediate two rows, with the mitters associated with each lateral line watering two tree rows, each emitter disposed between two trees within the rows; and spacing each lateral line from its adjacent lateral lines a distance approximately equal to the width of two rows of trees.

* * * * *